Figure 1:
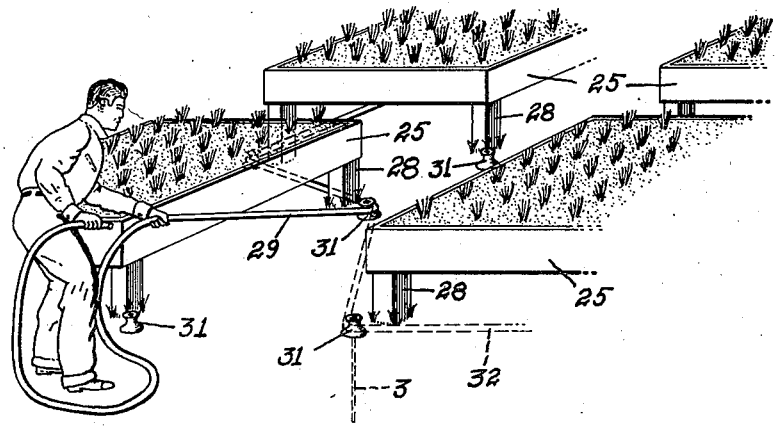

Dec. 2, 1941.  R. MAXTONE-GRAHAM  2,264,751

HOSE GUIDE

Filed Dec. 12, 1939

INVENTOR
ROBERT MAXTONE-GRAHAM
BY Charles O. Bruce
HIS ATTORNEY

Patented Dec. 2, 1941

2,264,751

UNITED STATES PATENT OFFICE 2,264,751

HOSE GUIDE

Robert Maxtone-Graham, Berkeley, Calif.

Application December 12, 1939, Serial No. 308,832

2 Claims. (Cl. 254—190)

My invention relates to garden appliances, and particularly to a hose guide.

Every person who has used garden hose of the ordinary rubber and fabric type has experienced the difficulty of drawing it around corners without shutting off the flow of water.

This difficulty is particularly experienced in greenhouses or conservatories where the hose must be manipulated around and between benches and tables, on lawns or gardens having trees and shrubs, and around building corners.

The hose guide which I have invented has a vertical member which can be set in the ground, and a rounded, rotatable sleeve against which the hose may be drawn. The sleeve radius is large enough to prevent the hose from collapsing under tension, and the low friction allows the hose to be pulled around a number of turns.

Figure 2:
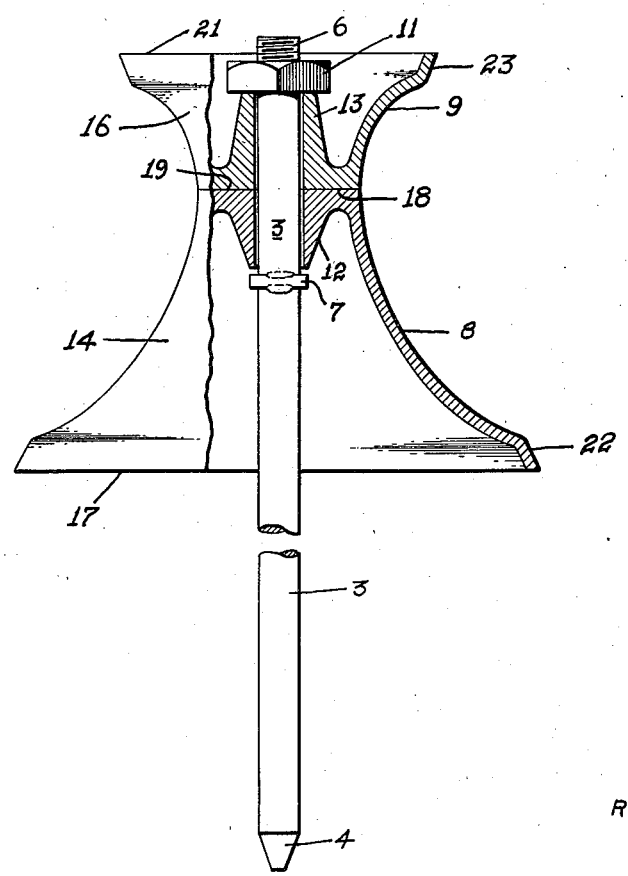

The manner of use and the details of construction may be seen in the drawing, wherein:

Figure 1 illustrates a number of my devices in conjunction with elevated growing beds; and Figure 2 is a view, partially in section, showing the details of construction of my hose guide.

The objects of my invention include the provision of a structure of the class described designed to permit relatively sharp bending of a hose without collapsing it; allowing a hose to be drawn freely around a number of corners; reducing hose wear at corners; eliminating destructive kinks in hose; providing a corner guide for drawing rope or any flexible material in a tortuous path. It is also an object of my invention to provide a structure adapted to reduce the labor of drawing hose, conduits, rope and similar objects in a path having abrupt changes of direction, and to relieve pressure inequalities and water stoppages in hose which is drawn around sharp corners.

The invention possesses other objects and features of advantage, some of which, together with the foregoing, will be specifically set forth in the detailed description of the invention hereunto annexed. It is to be understood that the invention is not to be limited to the specific form herein shown and described, since various other embodiments thereof may be employed within the scope of the appended claims.

Referring now to Figure 1 of the drawing, my device comprises a shaft 3, having a pointed lower end 4, and a threaded upper end 6. A collar or stop member 7 is spot welded, or otherwise secured, about shaft 3 at a proper distance from the threaded end 6. Guide fittings 8 and 9 are slid onto shaft 3 as far as permitted by the collar 7 and held by a nut 11 threaded onto the shaft end 6. The nut is so threaded on the shaft as to allow free rotation of the guide fittings 8 and 9, while at the same time preventing them from separating or coming off.

Guide fittings 8 and 9 are provided with central hubs 12 and 13, respectively, which permit free rotation about shaft 3 without tilting relative thereto. To these central hubs are fixed flared hollow skirts 14 and 16, respectively, shaped as surfaces of revolution about shaft 3. Skirt 14 is of greatest diameter at its lower rim 17, and reduces gradually in diameter toward its upper extremity, where it joins its hub 12. This skirt is preferably of such size and shape as to permit the hose to easily ride up the side thereof. The upper surface 18 of fitting 8 is a flat bearing normal to the shaft 3, and on it rests, rotatably about the shaft, a flat lower surface 19 forming the junction between hub 13 and skirt 16 of the upper fitting 9. Skirt 16 is of the same diameter adjacent lower bearing surface 19 as is skirt 17 adjacent upper bearing surface 18, increasing gradually in diameter toward its upper rim 21. The surfaces of lower and upper skirts 14 and 16 merge in a smooth curve adjacent bearing surfaces 18 and 19. The skirts may carry the same general curvatures to their rims 19 and 21, or may, as shown in Figure 2, form conical borders 22 and 23 adjacent thereto.

In the drawing, I have shown the radius of curvature of the surface of revolution formed by fittings 8 and 9 decreasing toward the upper rim. This creates an overhanging contour in the upper fitting 9, preventing the hose from being pulled off the upper portion of the guide when strain is applied.

The manner of use is illustrated in Figure 1 in conjunction with a number of elevated beds 27 such as might be found in a greenhouse. These beds are supported by corner posts 28, against which the hose 29 has previously been compelled to bear as the operator draws the hose around to various beds. I place one of my guides 31 adjacent the outer corner of each of posts 28 past which the hose is to be pulled.

The guide is preferably forced into the ground until the lower rim 17 is in contact therewith, so that additional support is available to hold shaft 3 in vertical position. The hose 29 is then pulled around the guide members, sliding over the smoothly contoured lower fitting 8 and rotating upper fitting 9. Where less support is needed for shaft 3, the lower rim 17 need not be forced into contact with the ground, and both fittings will revolve as the hose is pulled along.

The decreased friction at corners enables the gardener to turn many more corners than ordinarily would be possible. In Figure 1 the hose has been illustrated with two corner bends, and dotted line 32 illustrates it carried around a third corner. This is by no means a limitation, as I have found it possible to pull the hose along freely even when bent around a great many corners, particularly when the bearing surfaces are well lubricated.

The gardener may leave the guides permanently in position, or may change them from place to place as needed. Obviously, in permanent installations the shaft 3 might be modified for bolting or otherwise securing it to the floor or the bed legs.

The materials of which the device is made may be steel, iron, brass, or any other convenient and easily worked substance. It will be apparent that the precise curvature of the outer surface may be widely varied from that shown, for example, two frusto-conical members could be used; the guide may be made in one piece instead of two, the fittings may be solid instead of hollow, and the details of construction are susceptible of change as desired.

Not only is my device suited to handling hose, but it can also be used to draw ropes, cables, conduits, wire, and similar material around corners. In addition to preventing surface abrasion and assisting the operator to manipulate his hose more easily, breakdown of the hose body is reduced by preventing the collapse which usually occurs around sharp corners. This collapse is very prone to cause failure of the hose where great strains are introduced by the abrupt bending.

I claim:

1. In a device for guiding hose and the like around corners, the combination of a ground-engaging shaft having a tapered end to facilitate insertion thereof into the ground, a two sectional sleeve assembly having an outer surface whose longitudinal contour follows a smooth curve terminating at one end of said sleeve assembly in a circular base of one diameter and at its other end in a circular base of substantially greater diameter, and means for supporting said sleeve assembly on said shaft with each section thereof independently rotatable thereon and with the end of greater diameter facing the tapered end of said shaft.

2. In a device for guiding hose and the like around corners, the combination of a supporting shaft having a ground-engaging end; a pair of sleeves, each having its outer surface formed as a surface of revolution with the longitudinal contour of one outer surface following a curve of smaller radii of curvature than the other outer surface and terminating in an end diameter on one sleeve matching an end diameter of the other; and means for supporting said sleeves on said supporting shaft with their ends of similar diameters facing each other and with said sleeve whose outer surface follows the curve of greater radii of curvature, positioned nearer the ground-engaging end of said supporting shaft.

ROBERT MAXTONE-GRAHAM.